United States Patent [19]
Lamparter

[11] Patent Number: 5,604,480
[45] Date of Patent: Feb. 18, 1997

[54] FLASHING CAUTION/STOP BUS LIGHT ASSEMBLY

[75] Inventor: Ronald C. Lamparter, Grosse Pointe Shores, Mich.

[73] Assignee: Transpec Inc., Troy, Mich.

[21] Appl. No.: 536,705

[22] Filed: Sep. 29, 1995

[51] Int. Cl.$^6$ ............................................. B60Q 1/26
[52] U.S. Cl. ........................... 340/433; 340/470; 362/80
[58] Field of Search .............................. 340/433, 470, 340/468, 479; 362/61, 80, 83.3

[56] References Cited

U.S. PATENT DOCUMENTS

| | | | |
|---|---|---|---|
| 2,673,307 | 11/1952 | Weishuhn | 340/470 |
| 2,851,674 | 9/1958 | Boone | 340/470 |
| 2,854,650 | 9/1958 | Baker et al. | 340/470 |
| 3,678,457 | 7/1972 | Lev | 340/468 |
| 3,683,330 | 8/1972 | Lancaster | 340/470 |
| 3,902,159 | 8/1975 | Parolin | 340/433 |
| 4,426,638 | 1/1984 | Donley et al. | 340/433 |
| 4,569,002 | 2/1986 | English et al. | 362/80 |
| 4,574,269 | 3/1986 | Miller | 362/80.1 |
| 4,891,896 | 1/1990 | Boren | 40/541 |
| 5,073,768 | 12/1991 | Willaredt | 340/475 |
| 5,299,109 | 3/1994 | Grondal | 362/241 |
| 5,303,124 | 4/1994 | Wrobel | 362/20 |
| 5,345,705 | 9/1994 | Lawrence | 40/616 |
| 5,357,239 | 10/1994 | Lamparter | 340/433 |

FOREIGN PATENT DOCUMENTS

| | | | |
|---|---|---|---|
| 307991 | 3/1929 | United Kingdom | 340/470 |
| 331211 | 7/1930 | United Kingdom | 340/470 |

OTHER PUBLICATIONS

"Rear Light Assemblies," Electric Service Supplies Company Catalog Sheet 128 C–1, p. 150. Jul. 21, 1932.

Primary Examiner—Thomas Mullen
Assistant Examiner—Mark S. Rushing
Attorney, Agent, or Firm—Reising, Ethington, Barnard & Perry

[57] ABSTRACT

A bus light system (10) includes a plurality of indicator assemblies (16) located at each upper end corner of a bus (12). Each of the indicator assemblies (16) include first and third sections (24, 28) for indicating a slowing-to-stop condition which include illuminated word messages of CAUTION and STOPPING. Second and fourth sections (26, 34) indicate a stop condition which include illuminated word messages of DO NOT PASS and STOP. The first and third sections alternately flash during the slowing of the bus (12), while the second and fourth sections alternately flash during stopping of the bus (12) for loading and unloading.

18 Claims, 3 Drawing Sheets

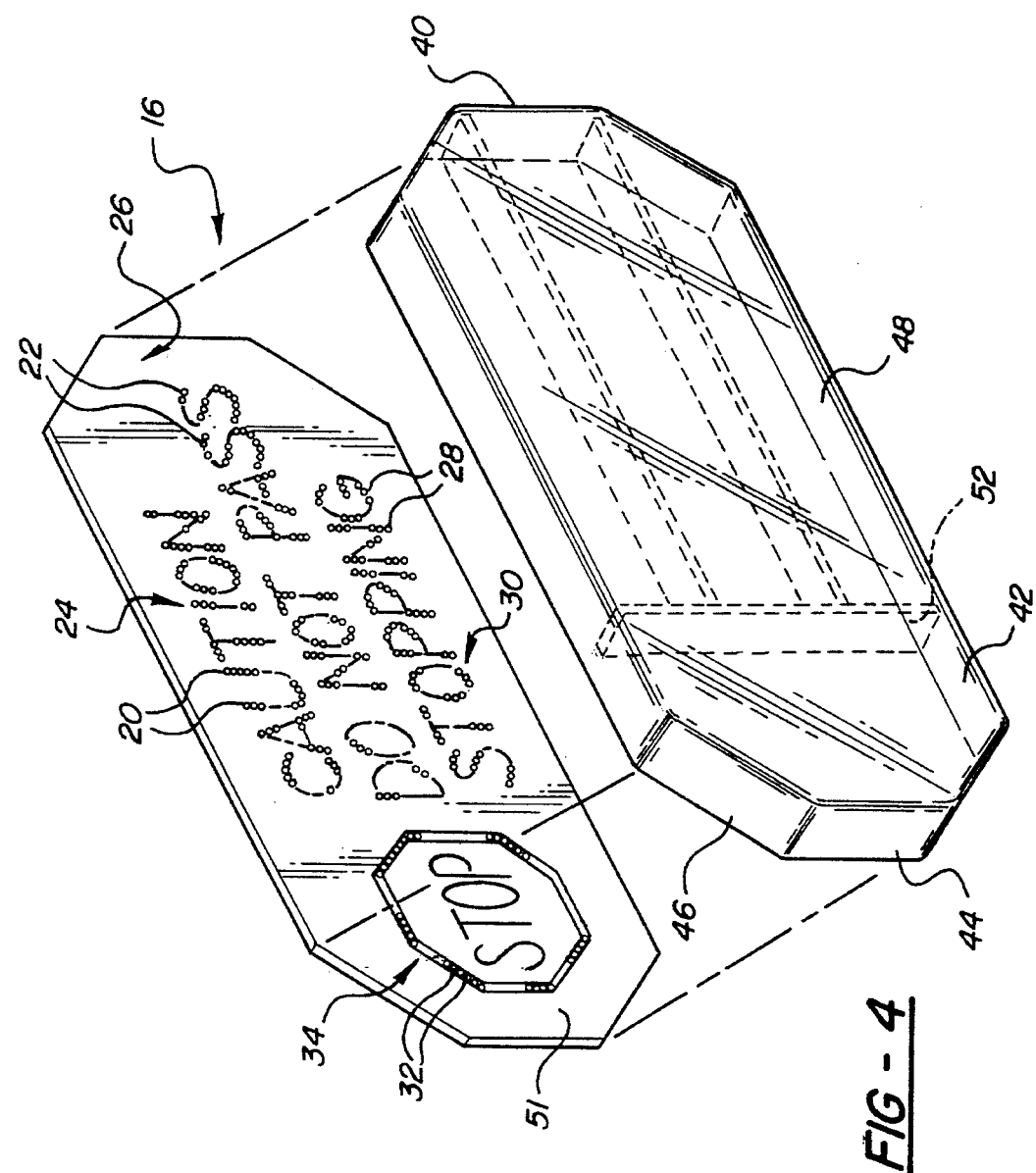

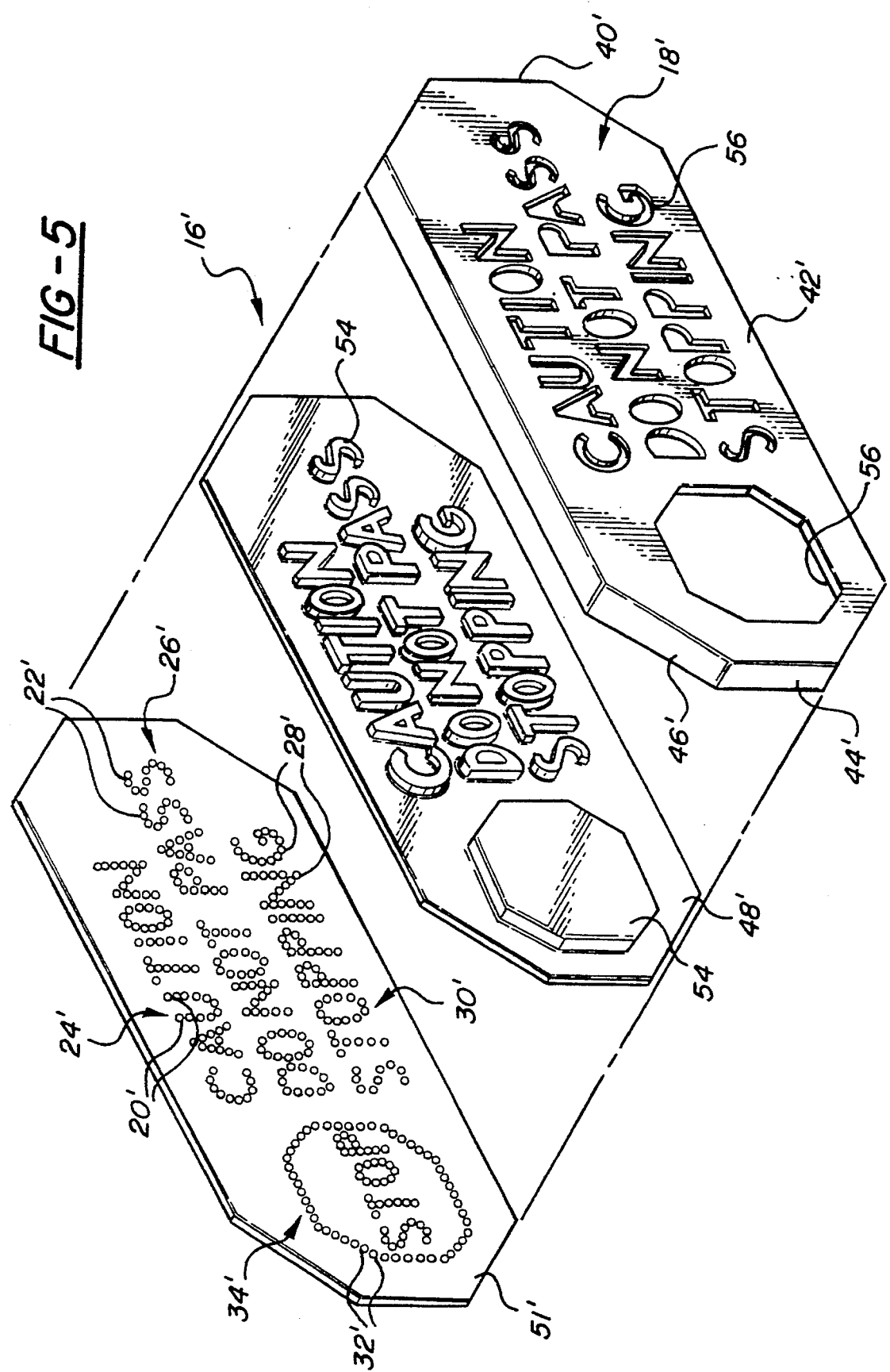

FLASHING CAUTION/STOP BUS LIGHT ASSEMBLY

TECHNICAL FIELD

The invention relates to light systems for buses, and more particularly toward school bus caution and stop lights to indicate when a school bus is stopping for unloading and loading children.

BACKGROUND OF THE INVENTION

Typical school buses include the common eight point light system. Such system includes two pairs of lights on the upper front and rear ends of the bus. Each of the pairs of lights include one red light and one yellow light. When a school bus is slowing and approaching a stop, the yellow lights alternately flash between end pairs. When the bus has arrived and comes to a stop, the red lights alternately flash to indicate to traffic to stop and not to pass the school bus. The problem with this system is that traffic may remain confused as to their duty when around a school bus with the eight point light system. There is a need to further instruct traffic when to stop and not to pass.

U.S. Pat. No. 5,357,239, issued Oct. 18, 1994 in the name of Lamparter discloses a typical school bus sign system having the common eight point light system which includes the upper caution and stop lights. This patent also discloses use of a STOP sign which pivots outwardly from the side of the bus when stopped for loading and unloading passengers.

There are known to be auxiliary multi-light systems for vehicles in the prior art. Exemplary of such lighted systems is U.S. Pat. No. 2,851,674, issued Sep. 9, 1958 in the name Boone which discloses a signaling apparatus for a truck which has a cabinet connected to the lower section of the truck. Lamps may illuminate the signally device, which includes the indications of NO PASSING PLEASE, PASS NOW AT OWN RISK, and WATCH WIDE TURN.

U.S. Pat. No. 5,073,768, issued Dec. 17, 1991 in the name of Willaredt discloses and auxiliary signal light which includes a light panel arranged in a diamond format to indicate turn signal and an emergency flashing signal.

U.S. Pat. No. 4,574,269, issued Mar. 4, 1986 in the name of Miller discloses a visual communicator for a rear window of a vehicle for displaying various messages by use of light emitting diodes. Such messages include THANKS, SORRY, SIGNAL, TIRES, LIGHTS, BRAKE, GAS, SMOKE, and PASS.

U.S. Pat. No. 3,678,457, issued Jul. 18, 1972 in the name of Lev discloses an indicator for automobiles with a light unit containing a plurality of separate light sources within chambers to display various messages, such as PASS, SLOW, etc. Of similar interest is U.S. Pat. No. 3,683,330, issued Aug. 8, 1972 in the name of Lancaster and U.S. Pat. No. 2,854,650, issued Sep. 30, 1958 in the name of Baker et al.

Other non-vehicle illuminated signs with indicia thereon have used neon lights, LEDs, fluorescent bulbs, etc. Such lights illuminate a section of the sign to display indicia, such as words or symbols. Exemplary thereof is U.S. Pat. No. 4,891,896, issued Jan. 9, 1990 in the name of Boren which discloses a simulated neon sign wherein a housing includes raised letters. A pigmented translucent coating is applied to the letters so that light from the interior can pass through the indicia. To simulate the halo effect of a neon light, additional pigmented coating is applied to the nonprojecting region. Fluorescent bulbs are utilized to illuminate the display.

U.S. Pat. No. 5,299,109, issued Mar. 29, 1994 in the name of Grondal discloses an LED exit light fixture which includes a frame and cover therefore that has a translucent and nontranslucent section to define the word EXIT. The light emitting diodes are positioned directly beneath the nontranslucent sections of the cover and adjacent the translucent sections in order to provide a uniform illumination of the word. Another type of LED exit lamp is illustrated in U.S. Pat. No. 5,303,124, issued Apr. 12, 1994 in the name of Wrobel.

U.S. Pat. No. 5,345,705, issued Sep. 13, 1994 in the name of Lawrence discloses a three-dimensional, contoured surface of a sign, which may include a light emitting diode therein to enhance the sign to a viewer.

Therefore, there is a specific need for bus light assemblies to specifically instruct the traffic as to their action during slowing and stopping for loading and unloading of children.

SUMMARY OF THE INVENTION

The invention is a bus light system adapted to be connected to a passenger bus. The assembly comprises a first indicator assembly including a lighted display. The lighted display includes at least first and second light elements for separately illuminating first and second sections of the display in first and second colors. The first and second sections include first and second word messages indicated thereon which are associated with the first and second light elements, respectively. The first word message indicates a slowing-to-stop condition of the passenger bus in said first color and the second word indicates a stop condition to unload and load passengers in said second color.

FIGURES IN THE DRAWINGS

Advantages of the present invention will be readily appreciated as the same becomes better understood by reference to the following detailed description when considered in connection with the accompanying drawings wherein:

FIG. 3 is a cross-sectional view of a first embodiment taken along lines 3—3 of FIG. 2;

FIG. 4 is an exploded view of the first embodiment; and

FIG. 5 is an exploded view of a second embodiment of the subject invention.

DESCRIPTION OF THE PREFERRED EMBODIMENT

Figure 1:
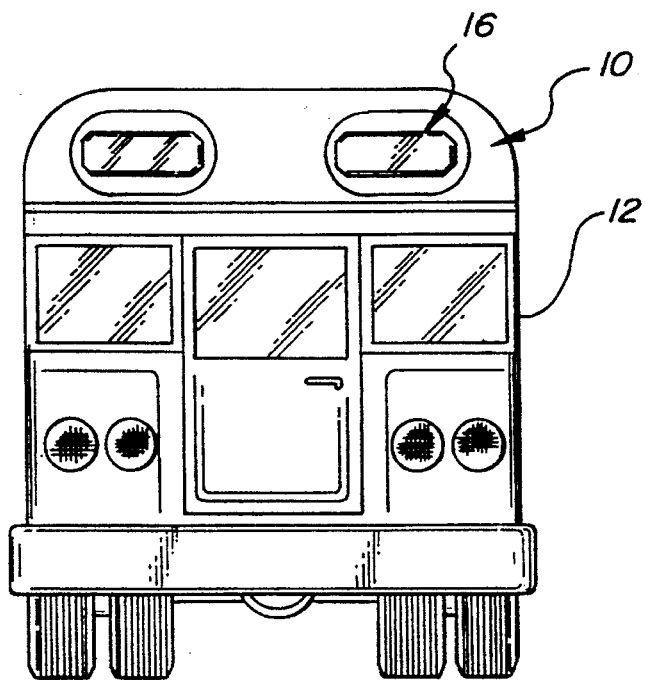
FIG. 1 is an end view of a passenger bus utilizing the subject invention.
Figure 2:
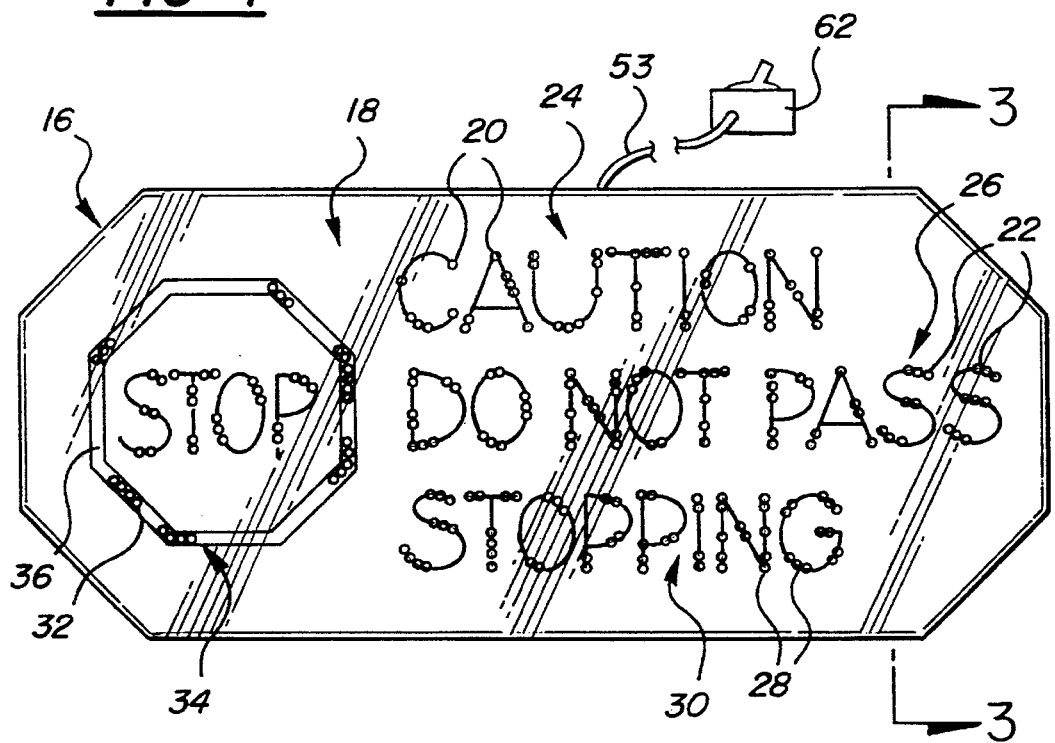
FIG. 2 is an enlarged view of the indicator assembly.

A bus light system 10 is adapted to be connected at the upper portion of an end of a passenger bus 12. The passenger bus 12 is typically a school bus such that when the bus 12 stops to unload and load children, the traffic is required to stop in response to the bus light system 10.

The bus light system 10 includes a plurality of indicator assemblies 16 connected at the upper section of the passenger bus 12. In general, a pair of indicator assemblies 16 are located at each end of the bus 12 adjacent each outer side of the bus 12. Each of the indicator assemblies 16 are similar in design and symmetry. Therefore, only one indicator assembly 16 is described.

The indicator assembly 16 includes a lighted display 18. The lighted display 18 includes at least first and second light element 20, 22 for separately illuminating first and second display sections 24, 26 of the display 18, respectively. The first and second sections 24, 26 include first and second display word messages indicated thereon and associated with the first and second light elements 20, 22, respectively. The first word message of the first display section 24 indicates a slowing-to-stop condition and the second word message of the second display section 26 indicates a stop condition. The lighted display 18 also includes a third display light element 28 for illuminating a third section 30 of the display 18 with a third word message wherein the first and third light elements flash alternately in the slowing-to-stop condition. The lighted display 18 includes a fourth light element 32 for illuminating a fourth display section of the display 18 with a fourth word message wherein the second and fourth light element 22, 32 flash alternately in the stop condition.

In the preferred embodiment, the word message of the first display section 24 comprises the word CAUTION, and word message of the second display section 26 includes the word DO NOT PASS, and the word message of the third display section 30 comprises the word STOPPING, and the word message of the fourth display section 34 comprises the words STOP. Furthermore, the word message of the fourth display section 34 includes a hexagon geometric shape 36 about the word STOP, as is typical for a stop sign designation. Each of the first, second, third and fourth light elements 20, 22, 28, 32 and display sections 24, 26, 30, 34, respectively, are separately located and positioned from one another.

The fourth display 34 comprising the hexagonal shape 36 with the word STOP therein is located on the outer side of the display 18 (with respect to placement of a pair of assemblies 16 connected on each end of a bus). The word messages CAUTION, DO NOT PASS, STOPPING are located sequentially from top to bottom on the second or inner side of the display 18. The first 24 and third 30 display sections are vertically spaced from one another on the lighted display 18. The second 26 and fourth 34 display sections are horizontally spaced from one another on the lighted display 18.

The first and third display sections 24, 30 illuminate the respective word messages amber or yellow in color, whereas the second and fourth sections 26, 34 illuminate red in color. In operation, during the slowing-to-stop condition, the word messages CAUTION and STOPPING are alternately illuminated. Once the bus 12 has come to a stop for unloading and loading, the word messages STOP and DO NOT PASS are alternately illuminated in each of the indicator assemblies 16. Therefore, within each assembly 16, two display sections are alternately illuminated and flashed at a time, either the red sections 26, 34 or the yellow sections 24, 30.

The indicator assembly 16 includes a housing 40 having a front side 42 with side walls 44 establishing a cavity 46 behind the front side 42. An integral lens 48 extends between the first 24, second 26, third 30 and fourth 34 display sections forming at least a part of the front side 42 and secured with the housing 40.

There are two embodiments of the indicator assembly 16, 16' wherein common components include similar reference numerals differing in embodiments by primed numerals. In both embodiments, the lens 48, 48' is translucent to allow illumination by the light elements 20, 22, 28, 32. The display 18, 18' is effectively the same, only differing by structure between the embodiments.

In the first embodiment 16, the housing 40 and lens 48 are injection molded as an integral, single unit of a clear smoked black plastic material. The location of the letters and geometric design 36 in each word message are of a thinner molded material 43 while the remainder of the front face 42 is thicker to provide isolated illumination. The housing 40 is an integral single molded plastic shape which can be secured and permanently installed on a bus 12. The cavity 46 may then be sealed from atmosphere with the light elements therein by a back panel 50. The housing 40 includes divider ribs 52 which extend from the front side 42 into the cavity 46 to isolate illumination of the light elements from each of those associated with different sections 24, 26, 30, 34. In this embodiment, the light elements 20, 22, 28, 32 are comprised of a plurality of LEDs which are secured to a circuit board 51 and forming each of the word messages by strings of LEDs. The LEDs are colored red or yellow depending on the section 24, 26, 30, 34 within which they are positioned. The LEDs are placed behind the thinner sections 43 of the front face 42 to clearly illuminate the word messages therethrough with a black background. A power conductor 53 may extend through the circuit board 51 and back panel 50 to independently supply power to each of the light elements 20, 22, 28, 32'.

Alternatively, a multi-colored lens 48 may be molded so that either yellow or red inserts are molded over the thinner sections 43 of the front face forming the respective word messages. The background may be molded with black with the red or yellow inserts molded in the thinner sections 43. Clear LEDs may then be positioned therebehind. Also, clear incandescent bulbs may be used in place of the LEDs.

The second embodiment 16' (FIG. 5) includes the housing 40' molded separate from the lens 48' and thereafter secured to one another. The display lens 48' is formed having a planar front surface which includes raised lens surfaces 54 protruding therefrom. The display lens 48' may alternatively be comprised of a generally box shaped member including sides and a back panel to provide a chamber for receiving and sealing the light elements therein. The front side 42' of the housing 40' includes openings 56 formed therein to receive the raised lens surfaces 54. The display lens 48' is positioned within the cavity 46' of the housing 40'. The raised surfaces 54 extend through the front side 42' projecting through the openings 56 external the housing 40'. The lens 48' may be secured within the housing 40' by suitable fasteners In this embodiment 16', the housing 40' may be injection molded of a black or opaque material with the openings 56 provided therein. The display lens 48' may be molded of a clear material, and may include colored or clear raised letters as similar with the first embodiments 16. Either LEDs or other lighting bulbs may be used, clear or colored depending on coloring of the lens 48'. Chamber divisions may also be used.

The bus light system 10 may include a switch 62 actuated by the bus driver to cause the flashing of the red stop word message display sections 26, 34 and separate flashing of the yellow display sections 24, 28 and respective word messages. The driver would typically use the switch 62 to power the yellow lights in a flashing manner when it is approaching a stop for the loading or unloading. When the bus 12 comes to a complete stop, the red stop light sections 26, 34 are switched by the switch 62 to alternately flash before the door of the bus 12 is opened. This switching function and control thereof may be accomplished by the switch 62, or other type of software controller.

Each of the indicator assemblies 16 or 16' are connected by the power connectors 53 to the switch 62 and in turn to a power supply such as the battery of the bus, as commonly known in the art. The user or driver of the bus 12 can switch between off, caution, and stop, which will selectively power and light the respective word or sections and provide the flashing alternating indication.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A bus light system adapted to be connected to a passenger bus, said system comprising:

a first indicator assembly adapted to be fixedly secured to an upper portion of a passenger bus, said indicator assembly including a lighted display;

said lighted display including first and second light elements for separately illuminating first and second sections of said display in first and second colors;

said first and second sections including first and second word messages indicated thereon and associated with said first and second light elements, respectively; said first word message indicating a slowing-to-stop condition in said first color and said second word message indicating a stop condition to load and unload passengers in said second color; and a third light element for illuminating a third section of said display and a third word message, said third light element flashing alternately with either said first light element or said second light element in its associated condition.

2. A system as set forth in claim 1 wherein said first and third light elements flash alternately in said slowing-to-stop condition.

3. A system as set forth in claim 2 wherein said lighted display includes a fourth light element for illuminating a fourth section of said display and a fourth word message, said second and fourth light elements flash alternately in said stop condition.

4. A system as set forth in claim 1 further including a second indicator assembly spaced from said first indicator assembly and adapted to be connected to a passenger bus.

5. A bus light system adapted to be connected to a passenger bus, said system comprising:

a first indicator assembly adapted to be fixedly secured to an upper portion of a passenger bus, said indicator assembly including a lighted display;

said lighted display including at least first and second light elements for separately illuminating first and second sections of said display in first and second colors;

said first and second sections including first and second word messages indicated thereon and associated with said first and second light elements, respectively; said first word message indicating a slowing-to-stop condition in said first color and said second word message indicating a stop condition to load and unload passengers in said second color;

a third light element for illuminating a third section of said display and a third word message, said first and third light elements adapted to flash alternately in said slowing-to-stop condition;

a fourth light element for illuminating a fourth section of said display and a fourth word message, said second and fourth light elements adapted to flash alternately in said stop condition; said first message being CAUTION.

6. A system as set forth in claim 5 wherein said second message is STOP.

7. A system as set forth in claim 6 wherein said third section displays the message STOPPING.

8. A system as set forth in claim 7 wherein said fourth section displays the message DO NOT PASS.

9. A system as set forth in claim 6 wherein said second section includes a hexagon shape about the message STOP.

10. A system as set forth in claim 4 further including a switch and controller.

11. A bus light system adapted to be connected to a passenger bus, said system comprising:

a first indicator assembly adapted to be fixedly secured to an upper portion of a passenger bus, said indicator assembly including a lighted display;

said lighted display including at least first and second light elements for separately illuminating first and second sections of said display in first and second colors;

said first and second sections including first and second word messages indicated thereon and associated with said first and second light elements, respectively; said first word message indicating a slowing-to-stop condition in said first color and said second word message indicating a stop condition to load and unload passengers in said second color;

a third light element for illuminating a third section of said display and a third word message, said first and third light elements adapted to flash alternately in said slowing-to-stop condition;

a fourth light element for illuminating a fourth section of said display and a fourth word message, said second and fourth light elements adapted to flash alternately in said stop condition;

each of said first, second, third and fourth light elements being separate from one another and said sections being separate from each other.

12. A bus light system adapted to be connected to a passenger bus, said system comprising:

a first indicator assembly adapted to be fixedly secured to an upper portion of a passenger bus, said indicator assembly including a lighted display;

said lighted display including at least first and second light elements for separately illuminating first and second sections of said display in first and second colors;

said first and second sections including first and second word messages indicated thereon and associated with said first and second light elements, respectively; said first word message indicating a slowing-to-stop condition in said first color and said second word message indicating a stop condition to load and unload passengers in said second color;

a third light element for illuminating a third section of said display and a third word message, said first and third light elements adapted to flash alternately in said slowing-to-stop condition;

a fourth light element for illuminating a fourth section of said display and a fourth word message, said second and fourth light elements adapted to flash alternately in said stop condition; said first and third sections being located vertically spaced from one another on said lighted display.

13. A system as set forth in claim 12 wherein second and fourth sections are located horizontally spaced from one another on said lighted display.

14. A system as set forth in claim 11 wherein said lighted display includes a single lens for said first, second, third and fourth sections.

15. A system as set forth in claim 14 wherein said indicator assembly includes a housing cooperating with said lens to provide a cavity for housing each of said light elements in isolation from each other.

16. A system as set forth in claim 14 wherein said housing and said lens are molded as an integral single unit.

17. A system as set forth in claim 14 wherein said housing and said lens are separately molded and subsequently secured to one another.

18. A bus light assembly comprising:

a molded housing having an exterior face with sides extending therefrom forming a cavity;

at least a portion of said exterior face formed of a translucent material, said cavity including at least three light elements for individually illuminating at least three separate sections of said exterior face, said light elements and said exterior face forming an illuminated display separately indicating a first word message in a slowing-to-stop condition of the passenger bus in a first illuminated color; and a second word message indicating a stop condition to load and unload passengers from the bus in a second illuminated color; and a third word message that flashes alternately with either the first word message or the second word message in its associated condition.

* * * * *